(12) United States Patent
Gaggero et al.

(10) Patent No.: US 11,731,604 B2
(45) Date of Patent: Aug. 22, 2023

(54) HYDRAULIC COMPONENT MOUNTING ASSEMBLY WITH ANTI-ROTATION POKA-YOKE BANJO CONNECTION

(71) Applicant: Continental Teves AG & Co. oHG, Frankfurt (DE)

(72) Inventors: Ivano Gaggero, Frankfurt (DE); Libero Magini, Frankfurt (DE)

(73) Assignee: Continental Teves AG & Co. OHG, Frankfurt am Main (DE)

( * ) Notice: Subject to any disclaimer, the term of this patent is extended or adjusted under 35 U.S.C. 154(b) by 0 days.

(21) Appl. No.: 16/521,771

(22) Filed: Jul. 25, 2019

(65) Prior Publication Data

US 2020/0001848 A1    Jan. 2, 2020

Related U.S. Application Data

(63) Continuation of application No. PCT/EP2018/065649, filed on Jun. 13, 2018.

(51) Int. Cl.
*B60T 17/04*    (2006.01)
*F16D 51/24*    (2006.01)
(Continued)

(52) U.S. Cl.
CPC ............ *B60T 17/043* (2013.01); *F16D 51/24* (2013.01); *F16D 65/22* (2013.01); *F16L 27/093* (2013.01);
(Continued)

(58) Field of Classification Search
CPC ...... B60T 17/04; B60T 17/043; F15B 15/149; F16D 51/24; F16D 65/22; F16D 2121/04; F16D 2125/04; F16L 27/093
See application file for complete search history.

(56) References Cited

U.S. PATENT DOCUMENTS 2,307,328 A * 1/1943 Martin ................. F16L 41/005
285/190
3,279,568 A    10/1966 Papin
(Continued)

FOREIGN PATENT DOCUMENTS

CN    101943233 A    1/2011
DE    4243183 A1    6/1994
(Continued)

OTHER PUBLICATIONS

English translation of DE4243183A1 (Year: 2005).*
(Continued)

*Primary Examiner* — Robert A. Siconolfi
*Assistant Examiner* — Mahbubur Rashid

(57) ABSTRACT

An anti-rotation banjo connection comprising a banjo plate attached to a pipe at its own first end edge and including an opening configured to receive a bolt, the bolt being configured to be screwed into a port of a hydraulic component, wherein a second end edge of the banjo plate, opposite to the first end edge, is provided with a positioning notch configured to partially surround a stopping fastener when the bolt is screwed into the port, whereby an edge wall delimiting the positioning notch is configured to interfere with the stopping fastener preventing the banjo plate from rotating about the bolt.

19 Claims, 10 Drawing Sheets

(51) Int. Cl.
   *F16D 65/22* (2006.01)
   *F16L 27/093* (2006.01)
   *F16D 121/04* (2012.01)
   *F16D 125/04* (2012.01)

(52) U.S. Cl.
   CPC ...... *F16D 2121/04* (2013.01); *F16D 2125/04* (2013.01); *F16D 2250/0084* (2013.01)

(56) References Cited

U.S. PATENT DOCUMENTS

| | | | | |
|---|---|---|---|---|
| 4,626,006 | A * | 12/1986 | Noguchi | B60T 17/04 285/143.1 |
| 4,679,829 | A * | 7/1987 | Yanagisawa | F16L 41/005 285/190 |
| 5,011,192 | A * | 4/1991 | Campo | F16L 41/005 285/190 |
| 5,174,612 | A * | 12/1992 | Schnell | F16L 41/086 285/49 |
| 5,228,725 | A * | 7/1993 | Aoyagi | F16L 27/093 285/141.1 |
| 5,533,764 | A * | 7/1996 | Williamson | F16L 41/086 285/212 |
| 5,593,279 | A * | 1/1997 | Hayashi | F04B 53/16 285/205 |
| 5,727,304 | A * | 3/1998 | Eybergen | F16L 41/086 285/142.1 |
| 5,829,794 | A * | 11/1998 | Schulz-Hausmann | F16L 23/036 285/205 |
| 5,853,201 | A * | 12/1998 | Izumi | B60H 1/00571 285/179 |
| 6,193,283 | B1 * | 2/2001 | Pickett, Jr. | F16L 41/086 285/137.11 |
| 6,312,020 | B1 | 11/2001 | Ketcham et al. | |
| 6,688,440 | B2 * | 2/2004 | Matsushita | B62L 3/023 188/24.11 |
| 6,969,094 | B2 * | 11/2005 | Frohling | F16L 23/032 285/379 |
| 7,226,088 | B2 * | 6/2007 | Skiba | F16L 19/005 285/114 |
| 7,540,539 | B2 * | 6/2009 | Fujiwara | F16L 41/086 285/205 |
| 8,075,021 | B2 * | 12/2011 | Park | B60K 11/04 285/208 |
| 8,468,849 | B2 * | 6/2013 | Kesler | F16L 41/086 285/139.2 |
| 8,991,563 | B2 * | 3/2015 | Suzuki | F16D 55/22 188/72.4 |
| 8,991,564 | B2 * | 3/2015 | Suzuki | B23K 20/124 188/72.4 |
| 2003/0042737 | A1 * | 3/2003 | Sampson | B60T 17/04 285/190 |
| 2011/0000748 | A1 | 1/2011 | Yamashita et al. | |
| 2013/0001942 | A1 | 1/2013 | Fulmer et al. | |
| 2015/0136537 | A1 * | 5/2015 | Kaneko | F16L 41/005 188/72.4 |
| 2015/0233438 | A1 * | 8/2015 | Atsuta | F16D 65/0068 188/73.31 |
| 2018/0056966 | A1 * | 3/2018 | Atsushi | B60T 17/043 |

FOREIGN PATENT DOCUMENTS

| | | | | |
|---|---|---|---|---|
| DE | 19602995 A1 | | 7/1997 | |
| GB | 343591 A | * | 2/1931 | ............ F16D 65/22 |
| JP | 2011006033 A | | 1/2011 | |
| WO | WO-9727094 A1 | * | 7/1997 | ........... F16D 55/226 |

OTHER PUBLICATIONS

DE 60301896 T2 (Year: 2006).*
FR 2931922 A3 (Year: 2009).*
International Search Report and Written Opinion dated Mar. 19, 2019 from corresponding International Patent Application No. PCT/EP2018/065649.
J. Erjavec; "TechOne: Automotrive Brakes":Chapter 16; Thomson Delmar Learning, Clifton Park, NY; 2004.
European Examination Report dated Oct. 13, 2022 for the counterpart European Patent Application No. 18 746 577.8.

* cited by examiner

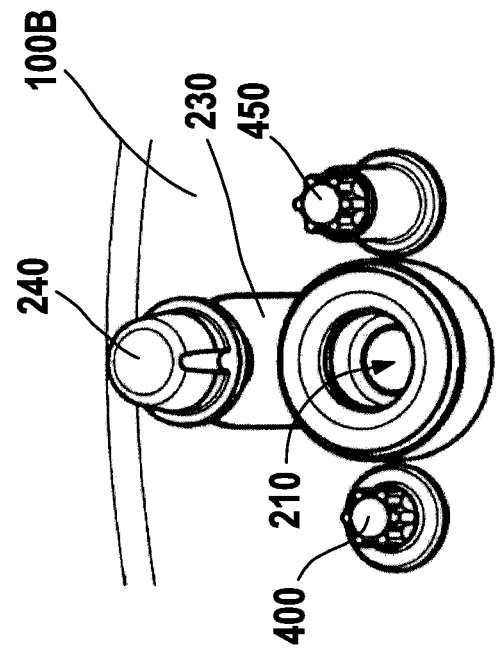
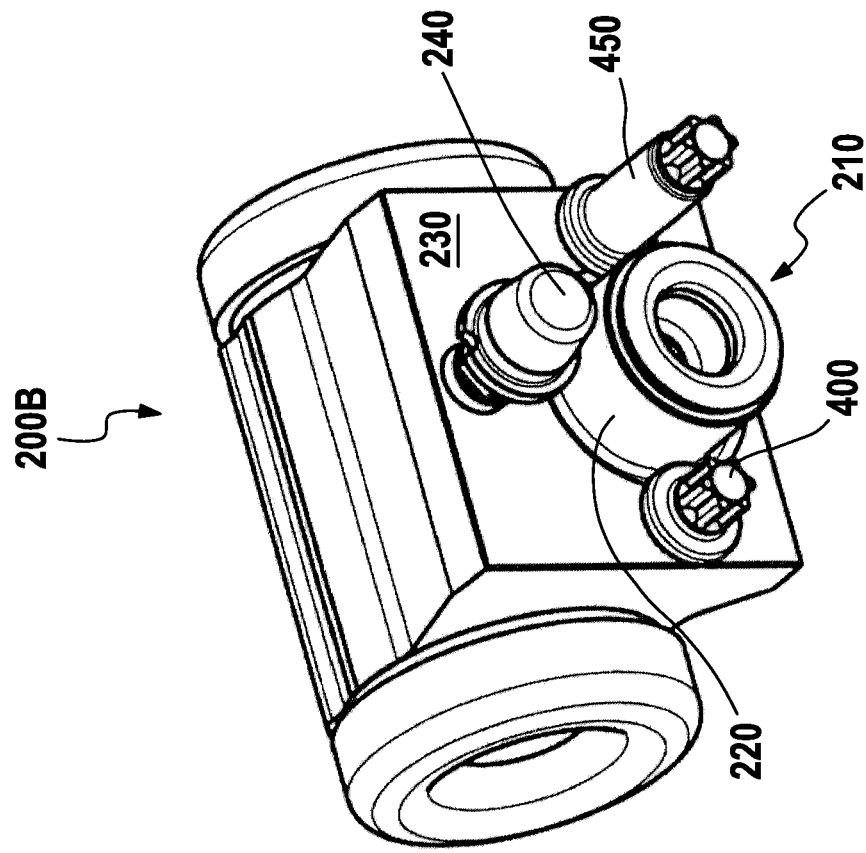
Fig. 6 (b)
Fig. 6 (a)

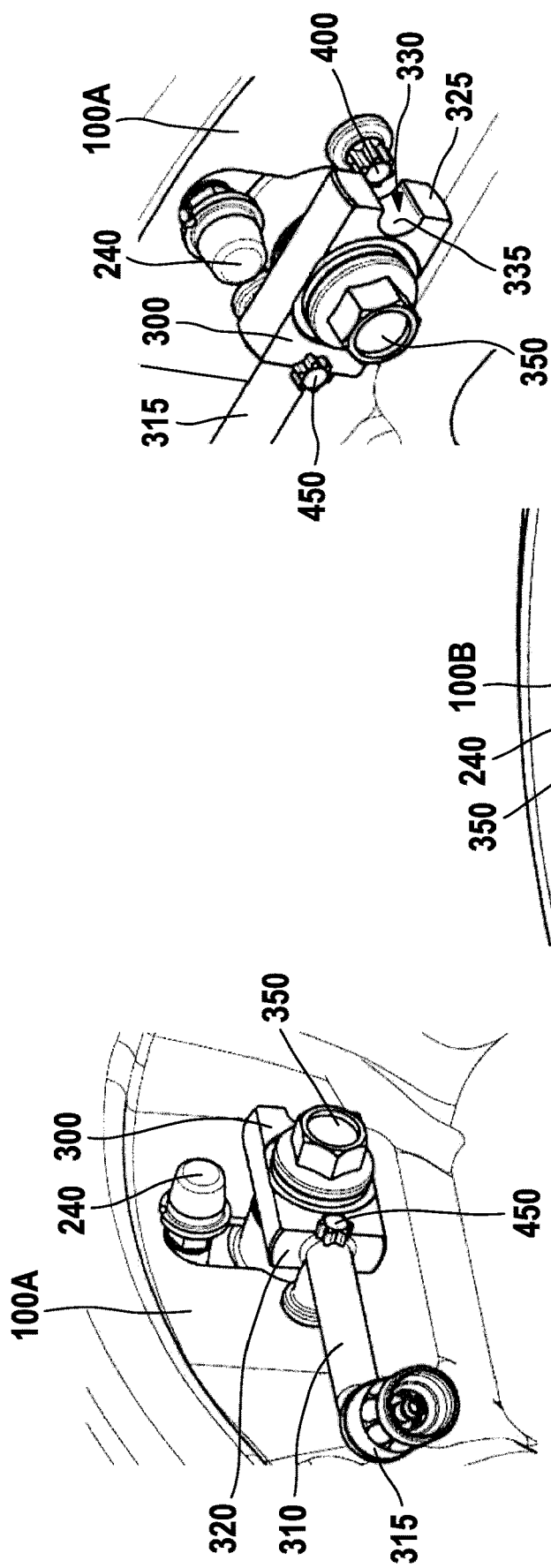
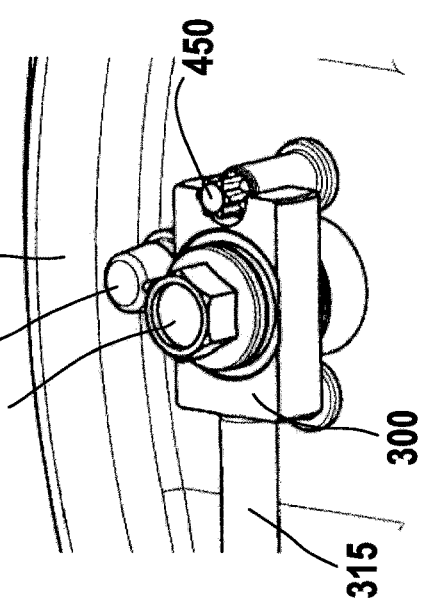

HYDRAULIC COMPONENT MOUNTING ASSEMBLY WITH ANTI-ROTATION POKA-YOKE BANJO CONNECTION

This application claims the benefit PCT Application PCT/EP2018/065649, filed Jun. 13, 2018. The disclosures of the above applications are incorporated herein by reference.

TECHNICAL FIELD

A hydraulic component mounting assembly with anti-rotation poka-yoke banjo connection, wherein the hydraulic component is a wheel cylinder of a drum brake, allowing in a simple, a reliable, efficient and inexpensive way to prevent fluid leakage and inadvertent errors causing misassembly.

In the following, reference will be mainly made to a mounting assembly of a wheel cylinder of a drum brake. However, the mounting assembly may be applied to other hydraulic components different from a wheel cylinder of a drum brake, as defined by the attached claims.

TECHNICAL BACKGROUND

A drum brake of a motor vehicle includes a brake backplate and a brake drum. The brake backplate has a central opening an outer end of a rotatable axle to extend therethrough to a wheel of the vehicle (although the brake backplate may be devoid of any central opening in some applications). The brake drum is integrally coupled to the rotatable axle so as to rotate therewith, while the brake backplate is usually mounted on the suspension assembly providing a stationary support in relation to the rotating brake drum. A set of brake shoes (usually a pair of brake shoes) are coupled to the brake backplate on the surface thereof facing the brake drum.

The brake shoes are configured to be operated by a wheel cylinder to be pushed into contact with the internal surface of the brake drum, thus reducing the rotation speed of the brake drum and, consequently, of the wheel and motor vehicle or operating as a parking brake.

The wheel cylinder is also mounted on the brake backplate on the surface thereof facing the brake drum. Conventionally, the wheel cylinder is provided with two internal pistons, connected to a respective shoe, hydraulically operated to move along the longitudinal axis of the wheel cylinder. Namely, the wheel cylinder has a feed port (hereinafter also indicated as "feed hole") through which brake fluid enters the wheel cylinder to exert a brake pressure (e.g. controlled by a brake pedal) on the two internal pistons causing these to space apart from each other and to push the shoes into contact with the internal surface of the brake drum. When brake pressure is released, brake fluid exits from the wheel cylinder, causing the two internal pistons to get closer to each other to make the shoes move away from the internal surface of the brake drum.

As for other automotive hydraulic arrangements, e.g. relating to fuel, oil and hydraulic systems, a banjo connection is a pipe fitting commonly used also for feeding the wheel cylinder with the brake fluid through the feed hole.

As disclosed, for instance, by J. Erjavec in "*TechOne: Automotive Brakes*", Thomson Delmar Learning, Clifton Park, N.Y., 2004, at chapter 16, a banjo connection is a fitting used to connect a hose of a fluid line to a port (or hole) of a hydraulic component at a close right angle, to let fluid pass from the fluid line to the hydraulic component and/or vice versa. A banjo connection is the combination of a bolt and a banjo block, usually in the shape of spherical segment or a plate, attached to a pipe, wherein the banjo block includes an opening configured to receive the bolt along a direction substantially orthogonal to the pipe (whereby the banjo block looks like the musical instrument of same name) to let the bolt be screwed into the port (that is internally threaded) of the hydraulic component to be connected to the fluid line; the pipe is configured to be connected to the hose of the fluid line. The opening is provided with a transverse aperture in fluid communication with the pipe, and the bolt is configured to offer a fluid path to put the pipe in fluid communication with the port or the hydraulic component. To this end, the bolt may be hollow and provided with a passageway in proximity of its own head that, along with the transverse aperture of the opening of the banjo block, allows the hollow portion of the bolt to be in fluid communication with the pipe when the bolt is received in the opening, whereby the hollow portion is part of the aforementioned fluid path. Alternatively, the bolt may be a solid piece and the external thread thereof is provided with at least one fluid flow notch forming a respective channel on the bolt external surface that is part of the aforementioned fluid path. Furthermore, to ensure seal when the bolt is tightened, washers are generally placed on opposite sides of the banjo block.

When a banjo connection is used for feeding the wheel cylinder of a drum brake with the brake fluid through the feed hole, the bolt is inserted into the opening of the banjo block and screwed (and tightened) into the feed hole of wheel cylinder, and the pipe of the banjo block is connected to a brake fluid supply hose so as to be in fluid communication with the brake fluid line.

During assembly, an operator inserts the bolt into the opening of the banjo block and screws it in the feed hole of wheel cylinder, and the pipe of the banjo block is connected to the brake fluid supply hose.

There is nothing to guarantee the correct arrangement of the combination of the brake fluid supply hose and the wheel cylinder, whereby an operator can inadvertently assemble the banjo connection of a right-hand brake fluid supply to a wheel cylinder mounted on the left-hand drum brake or the banjo connection of a left-hand brake fluid supply hose to a wheel cylinder mounted on the right-hand drum brake.

Also, during use and assembly, it is possible that the pipe and the banjo block rotate about the bolt, e.g. due to vibrations during motion of the vehicle or an inadvertent operation during assembly, thus jeopardizing the sealing of the banjo connection and causing brake fluid leakage.

In the prior art, a solution has been proposed in document US 2013/0001942 intended for a plurality of banjo connections of brake lines with ports of an ABS hydraulic block, wherein each banjo block cooperates with at least one unique adjacent banjo block to ensure both proper orientation relative to the other banjo connections and proper assembly with the correct ports by means of differences in any of exterior shape, size, and orientation of apertures in a banjo block from all other banjo blocks of the plurality of banjo connections.

However, such prior art solution also suffers from some drawbacks.

Most of all, it cannot be applied to a single banjo connection as needed for a drum brake wheel cylinder.

Also, it entails the need of manufacturing as many different banjo blocks as there are banjo connections, hence increasing design complexity and manufacturing costs.

The embodiments allow in a simple, efficient and inexpensive way to prevent fluid leakage and inadvertent errors causing misassembly in a hydraulic component mounting assembly with anti-rotation banjo connection.

SUMMARY

An anti-rotation banjo connection comprising a banjo plate attached to a pipe at its own first end edge and including an opening configured to receive a bolt, wherein the banjo plate further includes a hollow portion in fluid communication with the pipe and extending along a fluid flow axis of the banjo plate from the first end edge to the opening at which the banjo plate is provided with a transverse aperture configured to access said hollow portion, wherein the bolt is configured to be screwed into a port of a hydraulic component, whereby the port is in fluid communication with the pipe by means of fluid path offered by the bolt and said hollow portion when the bolt is screwed into the port, wherein a second end edge of the banjo plate, opposite to the first end edge, is provided with a positioning notch configured to partially surround a stopping fastener when the bolt is screwed into the port and the stopping fastener is inserted into a first mounting hole of a surface of the hydraulic component so as to protrude from the surface by a first distance longer than a plate distance by which the banjo plate is spaced apart from the surface when the bolt is screwed into the port, whereby an edge wall delimiting the positioning notch is configured to interfere with the stopping fastener preventing the banjo plate from rotating about the bolt when the stopping fastener is inserted into the first mounting hole and the bolt is screwed into the port and whereby the bolt is allowed to be screwed into the port when the stopping fastener is inserted into the first mounting hole only if the second end edge is closer than the first end edge to the stopping fastener.

In one or more embodiments, the positioning notch may be arranged on the second end edge along the fluid flow axis of the banjo plate.

In one or more embodiments, the positioning notch may be arranged on the second end edge in position that is offset from the fluid flow axis of the banjo plate.

In one or more embodiments, the pipe may be configured to be connected to a fluid hose through a fitting so as to be in fluid communication with a fluid line.

In one or more embodiments, the bolt may be a solid piece having an external thread that is provided with at least one fluid flow notch forming a respective channel on the bolt external surface that is part of said fluid path offered by the bolt.

In one or more embodiments a hydraulic component mounting assembly comprising:
a hydraulic component having a port and including a surface, wherein the surface includes a first mounting hole configured to receive a stopping fastener, wherein the stopping fastener protrudes from the surface by a first distance when the stopping fastener is inserted into the first mounting hole, and
an anti-rotation banjo connection as previously described, whereby the first distance is longer than the plate distance by which the banjo plate is spaced apart from the surface when the bolt is screwed into the port, whereby the stopping fastener is configured to allow the bolt to be screwed into the port only if the second end edge is closer than the first end edge to the stopping fastener when the stopping fastener is inserted into the first mounting hole, and whereby the edge wall delimiting the positioning notch interferes with the stopping fastener preventing the banjo plate from rotating about the bolt when the stopping fastener is inserted into the first mounting hole and the bolt is screwed into the port.

In one or more embodiments, the first mounting hole may be threaded, and the stopping fastener may be a stopping screw configured to be screwed into the first mounting hole.

In one or more embodiments, the surface may include a second mounting hole configured to receive an underplate fastener, wherein the underplate fastener protrudes from the surface by a second distance when the underplate fastener is inserted into the second mounting hole, wherein said second distance is shorter than the plate distance by which the banjo plate is spaced apart front the surface when the bolt is screwed into the port, whereby the banjo plate is configured to cover the underplate fastener when the under plate fastener is inserted into the second mounting hole and the bolt is screwed into the port.

In one or more embodiments, the surface may include a second mounting hole configured to receive an underplate fastener, wherein the underplate fastener protrudes from the surface by a second distance when the underplate fastener is inserted into the second mounting hole, wherein said second distance is shorter than a pipe distance by which the pipe is spaced apart from the surface when the bolt is screwed into the port, whereby the pipe is configured to cover the underplate fastener when the underplate fastener is inserted into the second mounting hole and the bolt is screwed into the port.

In one or more embodiments, the second mounting hole may be threaded and the underplate fastener may be an underplate screw configured to be screwed into the second mounting hole.

In one or more embodiments, the first mounting hole, the second mounting hole and the port may be aligned to each other along a straight line.

In one or more embodiments, said straight line may be substantially parallel to the fluid flow axis of the banjo plate when the bolt is screwed into the port.

In one or more embodiments, the port may be arranged on a collar protruding from the surface by a third distance, whereby the first distance is longer than the third distance.

In one or more embodiments, the surface may be a planar surface.

In one or more embodiments, the hydraulic component may be a wheel cylinder of a drum brake.

In one or more embodiments, the hydraulic component mounting assembly may further comprise a drum brake backplate, having a front surface configured to be facing a brake drum when the drum brake backplate is mounted on a motor vehicle, wherein the surface is configured to get at least partially in contact with the front surface of the drum brake backplate when the wheel cylinder is mounted on the latter, wherein the stopping fastener is configured to clamp in combination with the surface a respective edge of at least one drum brake backplate aperture.

In one or more embodiments, the underplate fastener may be configured to clamp in combination with the surface a respective edge of said at least one drum brake backplate aperture of a drum brake backplate aperture.

In one or more embodiments, a process for assembling the hydraulic component mounting assembly previously described, comprising the following:
A. causing the surface to get at least partially in contact with the from surface of the drum brake backplate;
B. inserting the stopping fastener into the first mounting hole, whereby the stopping fastener clamps, in combination with the surface, the respective edge of said at least one drum brake backplate aperture;
C. causing the positioning notch to partially surround the stopping screw;

D. inserting the bolt into the opening of the banjo plate and screwing the bolt into the port.

In one or more embodiments, step B may also comprise:

B. inserting the underplate fastener into the second mourning hole, whereby the underplate fastener clamps, in combination with the surface, the respective edge of said at least one drum brake backplate aperture.

The advantages offered by the hydraulic component mounting assembly with anti-rotation banjo connection are numerous.

First of all, the hydraulic component mounting assembly with anti-rotation banjo connection according to the invention provides a poka-yoke operation, by preventing inadvertent errors causing misassembly.

Also, it prevents fluid leakage during use and/or assembly, due to defective sealing caused by undue rotation the pipe and the banjo block about the bolt.

Moreover, the hydraulic component mounting assembly with anti-rotation banjo connection according to the invention ensures a reliable and efficient connection even for a single banjo connection, e.g. as needed for a drum brake wheel cylinder.

Furthermore, it has a simple arrangement and consequently it is easy to manufacture and to install, thereby reducing manufacturing, installation and maintenance costs.

BRIEF DESCRIPTION OF THE DRAWINGS

The present embodiments will be now described, by way of illustration and not by way of limitation, according to its embodiments, by particularly referring to the Figures of the annexed drawings, in which:

FIGS. 6a-6b show a perspective view of a hydraulic component mounting assembly according to the embodiments (FIG. 6a) and a perspective view of a particular thereof (FIG. 6b), wherein the hydraulic component is a wheel cylinder of a right-hand drum brake; and FIGS. 7a-c show a first partial rear perspective view (FIG. 7a) and a second partial rear perspective view (FIG. 7b) of an imaginary arrangement of a misassembly of the anti-rotation banjo connection of a right-hand brake fluid supply with the wheel cylinder of the left-hand drum brake shown in FIGS. 1-4, and a partial rear view of a correct assembly of the anti-rotation banjo connection of the right-hand brake fluid supply shown in FIG. 7c with the wheel cylinder of the right-hand drum brake with screws shown in FIG. 6.

DETAILED DESCRIPTION

As already mentioned, in the following, reference will be mainly made to embodiments of the hydraulic component mounting assembly with anti-rotation banjo connection according to the embodiments wherein the hydraulic component is a wheel cylinder of a drum brake. However, it is noted that the mounting assembly according to the embodiments may be applied to other hydraulic components different from a wheel cylinder of a drum brake, such as other automotive hydraulic arrangements, e.g. relating to fuel, oil and hydraulic systems, still remaining within the scope of the embodiments as defined by the attached claims.

Figure 4:
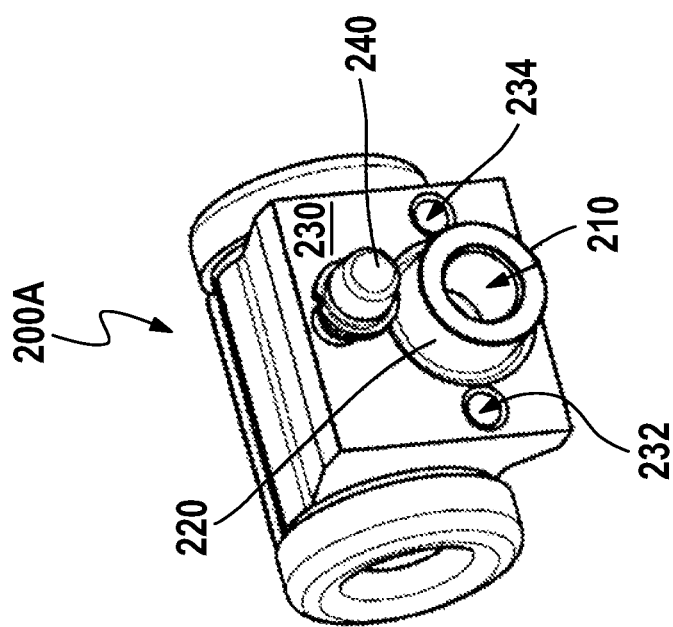
FIGS. 4a-4c show a perspective view of the wheel cylinder (FIG. 4a) of the hydraulic component mounting assembly of FIG. 1, a perspective view of some components (FIG. 4b) of the hydraulic component mounting assembly of FIG. 1, and a perspective view of a particular thereof (FIG. 4c)
Figure 4:
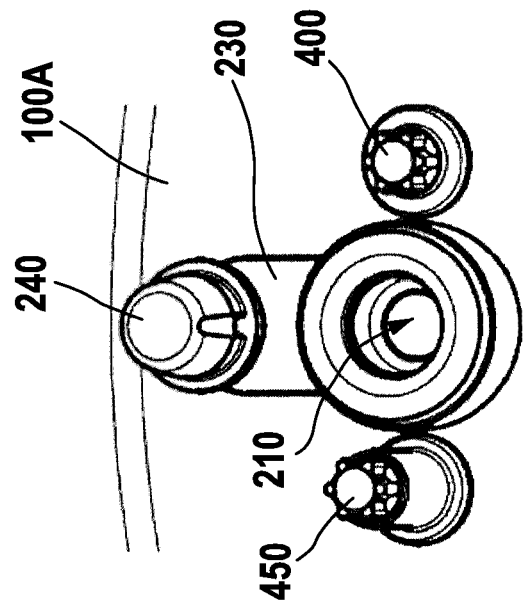
Figure 4:
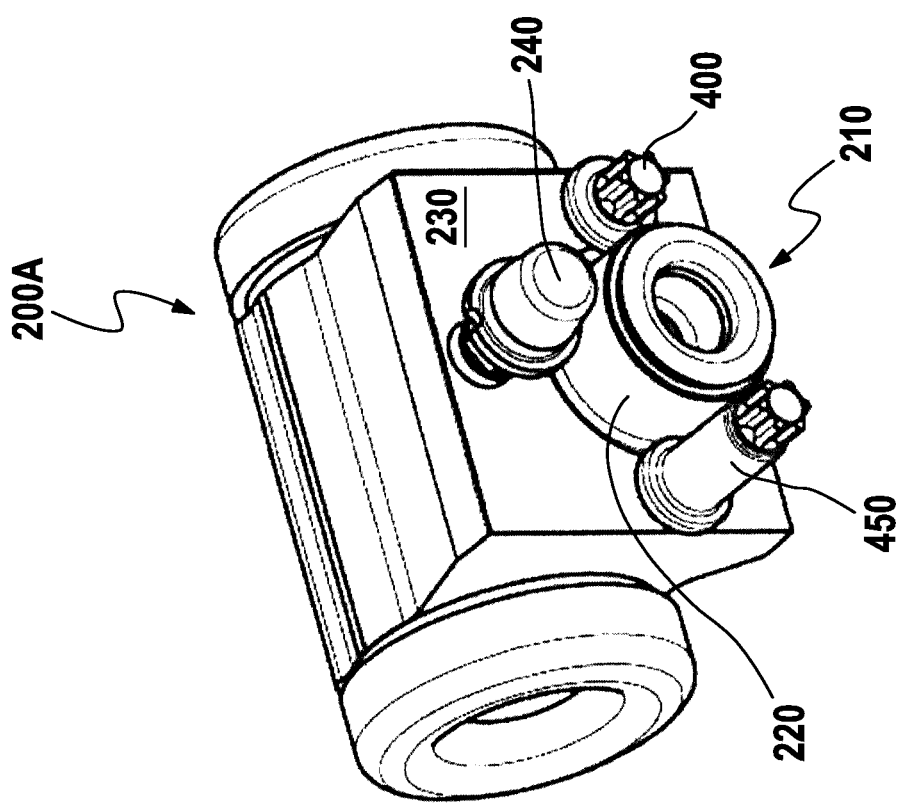
Figure 5:
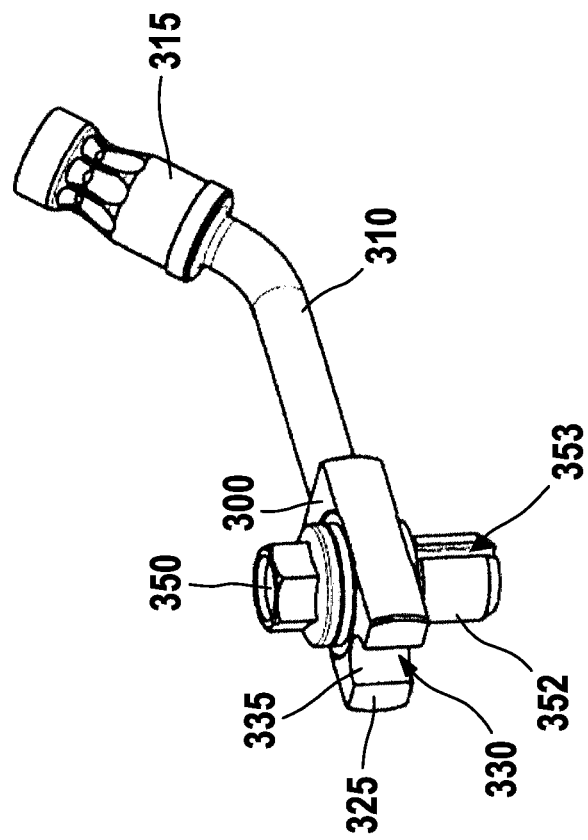
Figure 5:
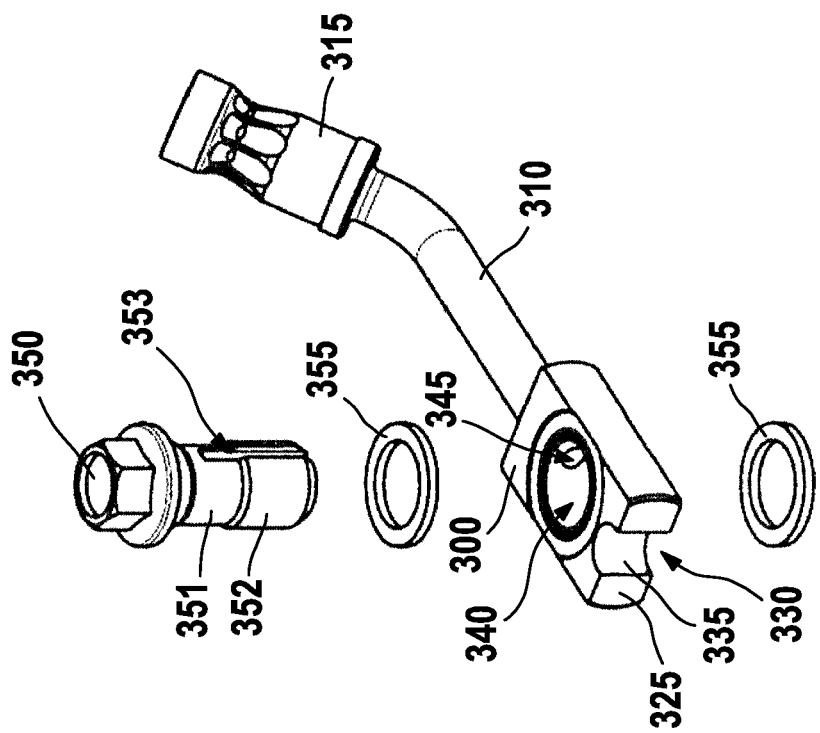
Figure 5:
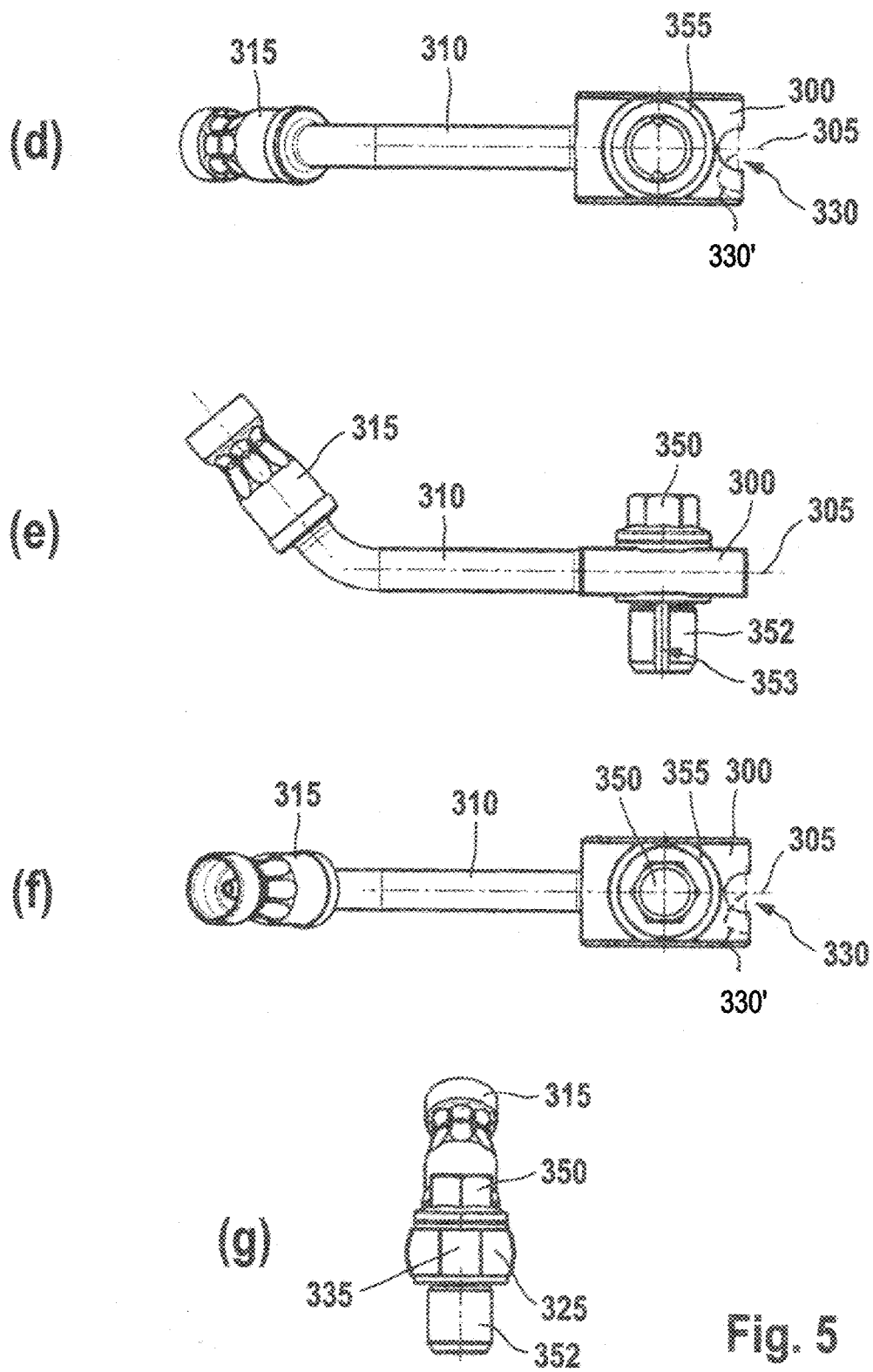

FIG. 1a shows a left-hand drum brake backplate 100A of a first embodiment of the hydraulic component mounting assembly with anti-rotation banjo connection according to the embodiments, wherein the hydraulic component is a wheel cylinder 200A of a left-hand drum brake (better shown in FIG. 4). Namely, FIG. 1a shows the rear surface 110A of the drum brake backplate 100A opposite to the front surface that is configured to be facing the brake drum when the brake backplate 100A is installed and operative. Furthermore, the drum brake backplate 100A has other conventional elements, such as through holes 150 configured to receive bolts (not shown), commonly used for mounting the brake backplate 100 on a motor vehicle, e.g. on a suspension assembly of a wheel, and a central opening 160 allowing an outer end of a rotatable axle to extend therethrough to a wheel of the vehicle.

In other embodiments, the hydraulic component mounting assembly according to the embodiments may have a drum brake back plate 100A' that is devoid of any central opening, as shown in FIG. 1b (wherein the rear surface of the drum brake backplate 100A' is indicated with the reference numeral 110A'), still remaining within the scope of the present invention as defined by the attached claims.

Figure 3:
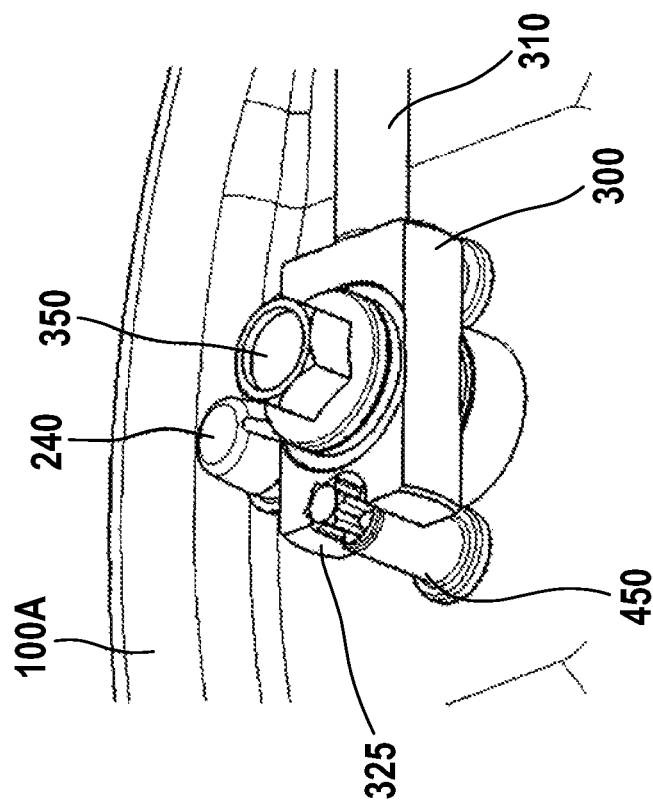
FIG. 3 shows a perspective view of a perspective view of second particular of the hydraulic component mounting assembly of FIG. 1.
Figure 2:
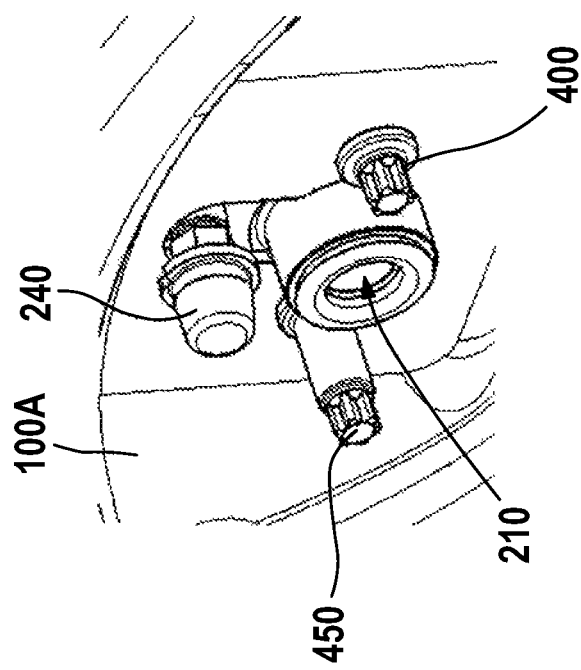
FIG. 2 shows a perspective view of a first particular of the hydraulic component mounting assembly of FIG. 1.

As also shown in FIGS. 2-4, a banjo connection is used for feeding the wheel cylinder 200A with the brake fluid through a feed hole 210 with which a collar 220 is provided, wherein the collar 220 protrudes from a planar surface 230 of the wheel cylinder 200A that is configured to get (at least partially) in contact with the front surface of the drum brake backplate 100A when the wheel cylinder 200A is mounted on the latter. However, it should be understood that neither the collar 220 nor the planarity of the surface of the wheel cylinder (that is configured to get at least partially in contact with the front surface of the drum brake backplate 100A when the wheel cylinder is mounted on the latter) are essential features; rather the feed hole 210 of the wheel cylinder can be directly located on the surface that is configured to get (at least partially) in contact with the front surface of the drum brake backplate 100A when the wheel cylinder 200A is mounted on the latter, and such surface can be a possibly smooth and/or sharp uneven surface, instead of a planar one.

On its own planar surface 230, the wheel cylinder 200A further includes an air bleeder valve removably closed by an air bleeder cap 240, and first and second mounting threaded holes 232 and 234 configured to receive a stopping screw 450 and an underplate screw 400, respectively, the role of which will be illustrated later. In particular, to mount the wheel cylinder 200A on the drum brake backplate 100A, the planar surface 230 of the wheel cylinder 200A is caused to get (at least partially) in contact with the from surface of the drum brake backplate 100A and the stopping screw 450 and underplate screw 400 are inserted into through holes of the drum brake backplate 100A and then screwed (and tightened) into the first and second mounting threaded holes 232 and 234, respectively, of the planar surface 230 of the wheel cylinder 200A: the underplate screw 400 and stopping screw 450, in combination with the planar surface 230 of the wheel cylinder 200A, conventionally clamp the edges of the respective through holes of the drum brake backplate 100A so as to firmly fasten the wheel cylinder 200A to the drum brake backplate 100A.

In other embodiments, the stopping screw 450 and/or underplate screw 400 may be replaced by a different type of fasteners, such as a stopping rivet and/or an underplate rivet, configured to be inserted into first and second mounting holes, respectively, of the planar surface 230 of the wheel cylinder 200A.

Furthermore, in general, the stopping fastener and/or the underplate fasteners are inserted into the first and second mounting holes so as to conventionally clamp, in combination with the planar surface 230 of the wheel cylinder 200A, respective edges of at least one drum brake backplate aperture, thus firmly fastening the wheel cylinder 200A to the drum brake backplate 100A, still remaining within the scope of the present invention.

As shown in FIGS. 1-4, when the stopping screw 450 and underplate screw 400 are screwed (and tightened) into the first and second mounting threaded holes 232 and 234, respectively, they protrude from the planar surface 230 by first and second distances, respectively. Namely, the first distance (by which the stopping screw 450 protrudes from the planar surface 230 when screwed and tightened into the first mounting threaded hole 232) is longer than the third distance by which the collar 220 protrudes from the planar surface 230; differently, the second distance (by which the underplate screw 400 protrudes from the planar surface 230 when screwed and tightened into the second mounting threaded hole 234) is shorter than the third distance by which the collar 220 protrudes from the planar surface 230. Obviously, when the wheel cylinder 200A is mounted on the drum brake backplate 100A (by means of the stopping screw 450 and underplate screw 400), the same relationships among the distances relative to the planar surface 230, just illustrated, are valid with reference among the distances relative to the drum brake backplate 100A.

In particular, FIGS. 4b and 4c show the wheel cylinder 200A of FIG. 4a with the stopping screw 450 and underplate screw 400, which are not part of the wheel cylinder 200A, already screwed (and tightened) into the first and second mounting threaded holes 232 and 234, respectively.

Figure 5:
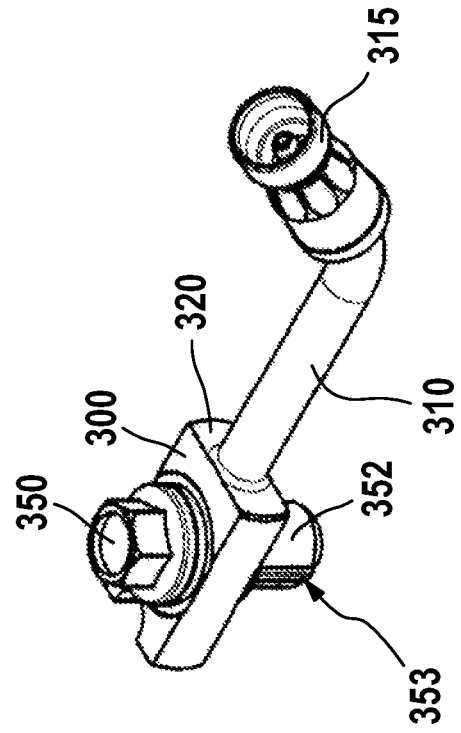
FIGS. 5a-5g show an exploded from perspective view (FIG. 5a), a front perspective view (FIG. 5b), a rear perspective view (FIG. 5c), a bottom plan view (FIG. 5d), a right side view (FIG. 5e), a top plan view (FIG. 5f) and a front view (FIG. 5g) of the anti-rotation banjo connection of the hydraulic component mounting assembly of FIG. 1.

As shown in detail in FIG. 5, said banjo connection is the combination of a banjo plate 300 and a bolt 350, wherein the banjo plate 300 is conventionally attached to a pipe 310 so that a hollow portion of the banjo plate 300 (not visible in the Figures, since it is inside the banjo plate 300) is in fluid communication with the pipe 310. The pipe 310 is configured to be connected to a brake fluid supply hose through a fitting 315 so as to be in fluid communication with a brake fluid line.

The banjo plate 300 conventionally includes an opening 340 configured to receive the bolt 350 along a direction substantially orthogonal to a fluid flow axis 305 of the banjo plate 300 to let the bolt 300 be screwed into the feed hole 210 (that is internally threaded) of the wheel cylinder 200A so as to be connected to the fluid line through the pipe 310; conventional washers 355 or similar sealing elements may be placed on opposite sides of the banjo plate 300 when the bolt 350 is tightened. The hollow portion of the banjo plate 300 extends along the fluid flow axis 305 of the banjo plate 300 from a first end edge 320, at which the banjo plate 300 is attached to the pipe 310, to the opening 340 at which the banjo plate 300 is provided with a transverse aperture 345 to access the hollow portion of the banjo plate 300. Hence, when the bolt 300 is screwed (and tightened) into the feed hole 210, the latter is in fluid communication with the pipe 310 by means of the fluid path conventionally offered by the bolt 350 and the hollow portion of the banjo plate 300. The bolt 350 is a solid piece having a substantially cylindrical stem including a proximal portion 351 and a distal portion 352, wherein the diameter of the proximal portion 351 is lower than the diameter of the distal portion 352, wherein the external thread (not shown in the Figures) is arranged on the distal portion 352, and wherein the stem is provided with two diametrically opposite fluid flow notches 353 forming respective channels on the bolt stem external surface that is part of the aforementioned fluid path. However, the specific arrangement of the bolt 350 dedicated to offer such fluid path is not essential for the invention and other arrangements, such as a hollow bolt provided with a passageway in proximity of its own head, are possible for other embodiments of the invention.

A second end edge 325 of the banjo plate 300, that is free and opposite to the first end edge 320 (namely along the fluid flow axis 305 of the banjo plate 300), is provided with a positioning notch 330 (shown in FIG. 6b) configured to partially surround the stopping screw 450 when the latter is screwed into the first mounting threaded hole 232.

Figure 1:
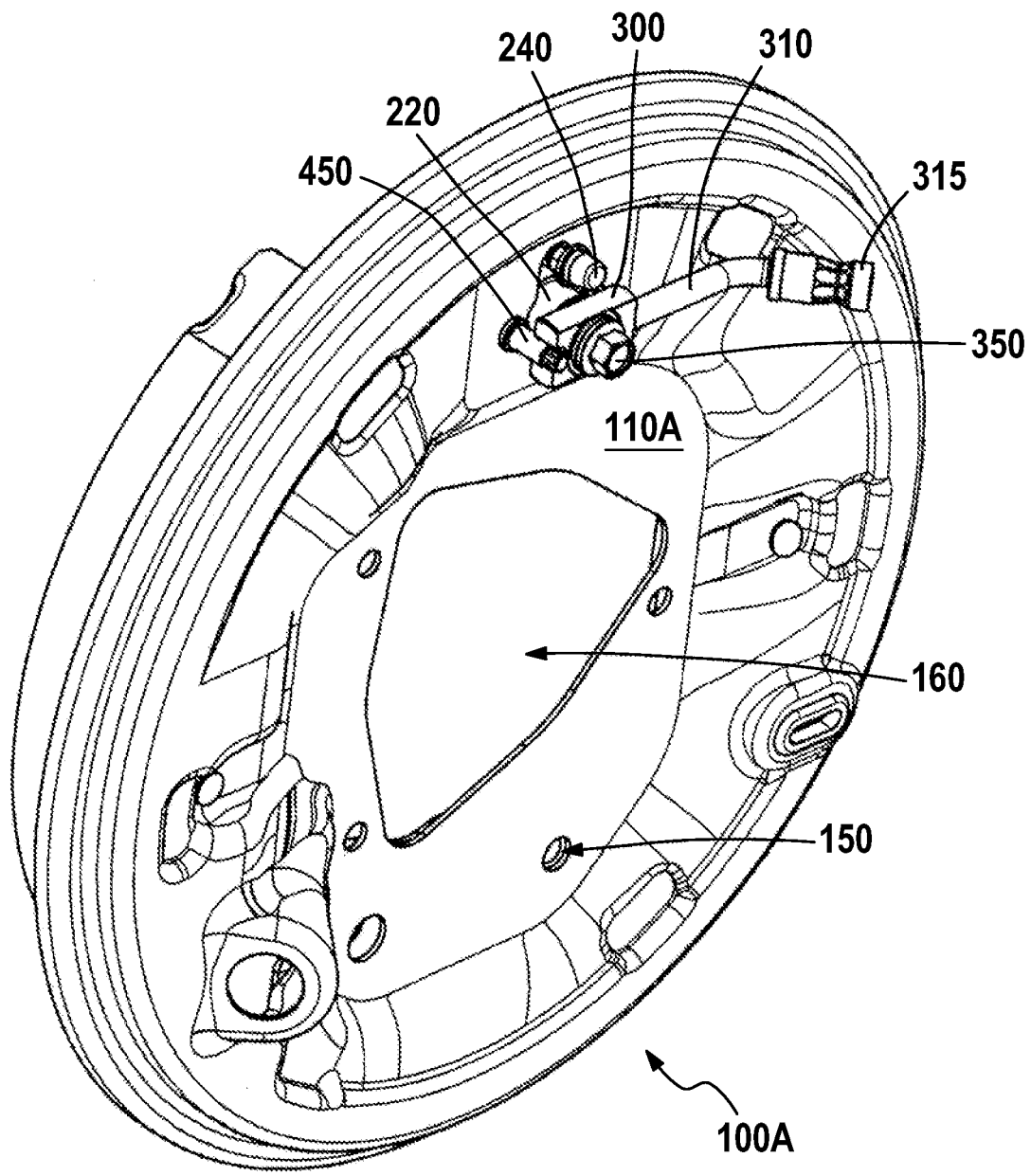
FIGS. 1a and 1b show a rear perspective view (FIG. 1a) of the left-hand drum brake backplate of a first embodiment of the hydraulic component mounting assembly with anti-rotation banjo connection according to the embodiments, wherein the hydraulic component is a wheel cylinder of a left-hand drum brake, and a rear perspective view (FIG. 1b) of a variant thereof.
Figure 1:
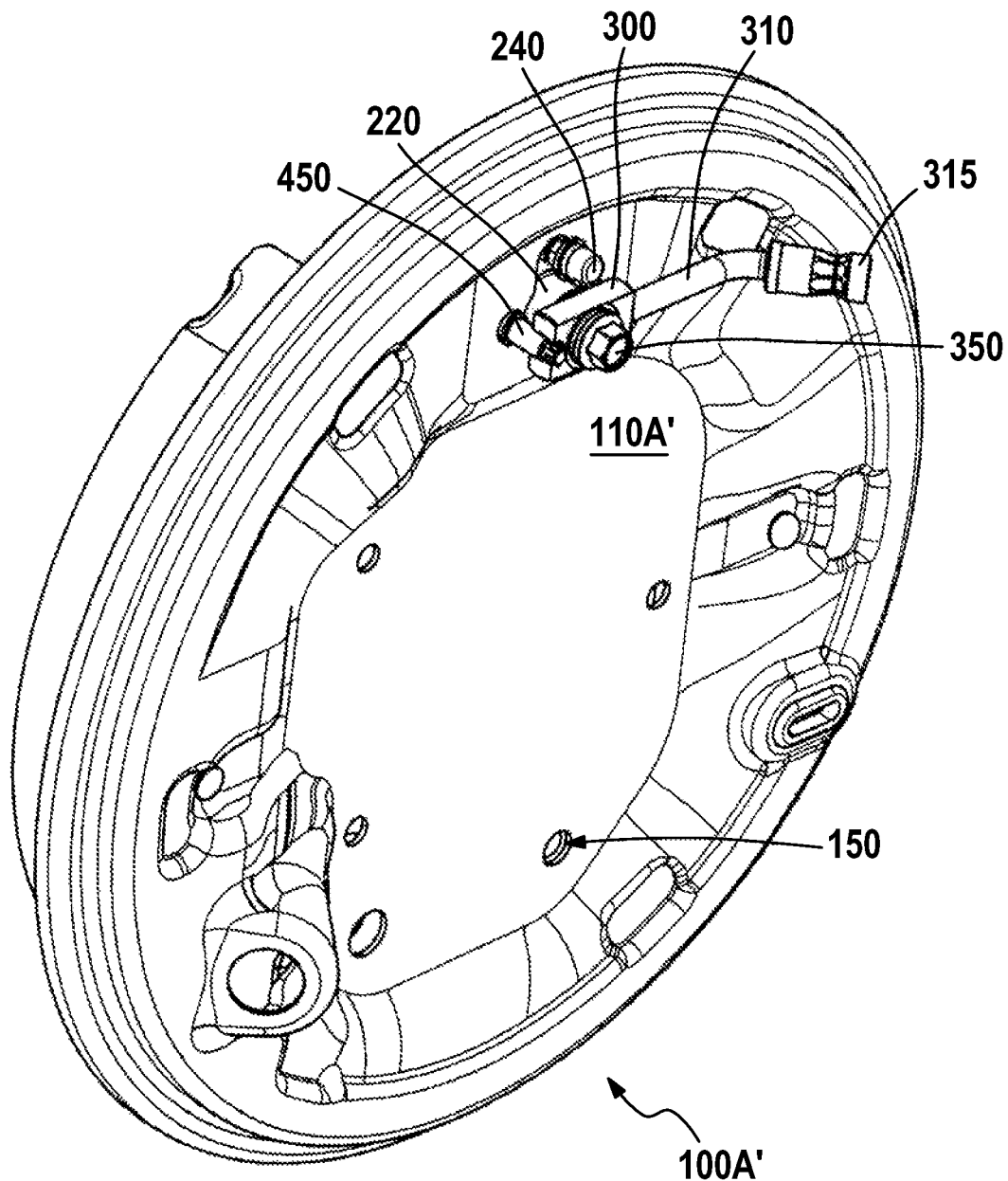

When the stopping screw 450 and underplate screw 400 are screwed (and tightened) into the first and second mounting threaded holes 232 and 234, respectively, the banjo plate 300 can be fastened by screwing (and tightening) the bolt 350 into the feed hole 210 of the wheel cylinder 200A only with the orientation of the banjo plate 300 shown in the assembly configuration of FIGS. 1 and 3. Namely, the second end edge 325 of the banjo plate 300 must be positioned in proximity of the stopping screw 450, i.e. the second end edge 325 must be closer to the stopping screw 450 than to the underplate screw 400, so as to cause the positioning notch 330, having a shape matching the shape of the stopping screw 450, to partially surround the stopping screw 450.

This arrangement of the stopping screw 450 and positioning notch 330 of the second end edge 325 of the banjo plate 300 produces an anti-rotation effect. In fact, if the banjo plate 300 is made or tends to rotate about the bolt 350, then the edge wall 335 delimiting the positioning notch 330 interferes with the stopping screw 450 acting as a stop element preventing the banjo plate 300 from actually rotating about the bolt 350.

Moreover, in the case where the wheel cylinder 200A is devoid of any collar 220 and the feed hole 210 is directly located on the surface 230, then it is sufficient that the first distance (by which the stopping screw 450 protrudes from the planar surface 230 when screwed and tightened into the first mounting threaded hole 232) is longer than the distance by which the banjo plate 300 is spaced apart from the surface 230 when the bolt 350 is screwed (and tightened) into the feed hole 210.

In the assembly configuration of FIGS. 1 and 3, the first end edge 320 of the banjo plate 300 is positioned in proximity of the underplate screw 400, i.e. the first end edge 320 is closer to the underplate screw 400 than to the stopping screw 450, and the banjo plate 300 covers the underplate screw 400. However, it should be understood that this specific mutual arrangement of the banjo plate 300 and the underplate screw 400 is not essential for the invention. For instance, other embodiments may have a different size and/or shape of the banjo plate 300 configured to cause the pipe 310 (rather than the banjo plate 300) to cover the underplate screw 400, when the bolt 350 is screwed (and tightened) into the feed hole 210 of the wheel cylinder 200A with the positioning notch 330 partially surrounding the stopping screw 450; in this case, it is sufficient that said second distance (by which the underplate screw 400 protrudes from the planar surface 230 when screwed and tightened into the second mounting threaded hole 234) is shorter than the distance by which the pipe 310 is spaced apart from the planar surface 230 of the wheel cylinder 200A when the bolt 350 is screwed (and tightened) into the feed hole 210 thereof. Furthermore, in the case where the wheel cylinder 200A is devoid of any collar 220 and the feed hole 210 is directly located on the surface 230, then the second mounting threaded hole 234 could be located in a recess of the surface 230 so that the distance by which the underplate screw 400 protrudes from the recess is shorter than the distance by which the banjo plate 300 or the pipe 310 is spaced apart from such recess of the surface 230 when the bolt 350 is screwed (and tightened) into the reed hole 210.

Figure 8A:
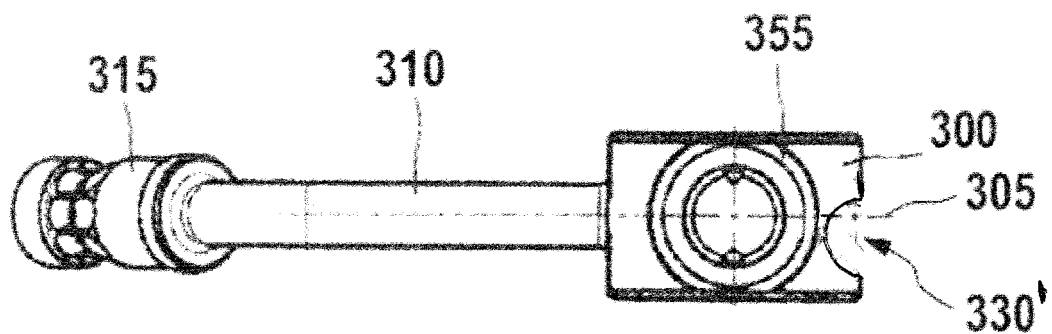
FIGS. 8a-8b show a bottom plan view (FIG. 5d), and a top plan view (FIG. 5f) of the anti-rotation banjo connection of the hydraulic component mounting assembly of FIG. 1 having an offset positioning notch; and In the Figures, identical reference numerals will be used for alike elements.
Figure 8B:
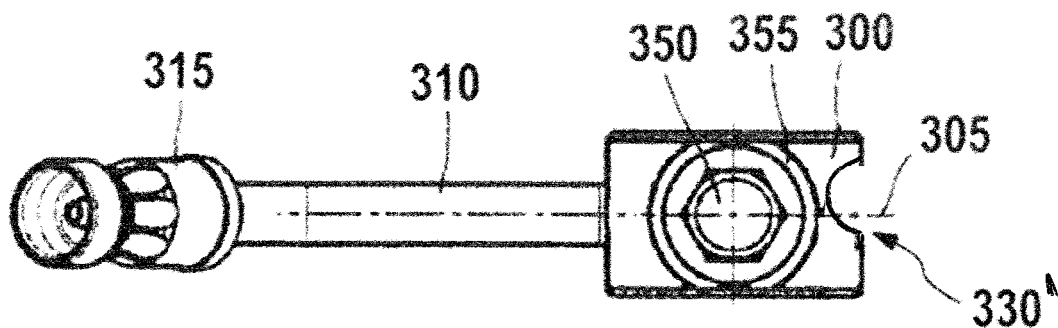

In one or more embodiments, the positioning notch 330 is centrally arranged on the second end edge 325 of the banjo plate 300, namely along the fluid flow axis 305 of the banjo plate 300. However, this is not an essential feature of the invention, and the positioning notch 330 can also be arranged on the second end edge 325 also in a side position, i.e. a position that is offset from the fluid flow axis 305 of the banjo plate 300 illustrated in FIGS. 8a and 8b at 330'.

In one or more embodiments, the first and second mounting threaded holes 232 and 234 and the feed hole 210 are aligned to each other along a straight line, optionally substantially parallel to the fluid flow axis 305 of the banjo plate 300 when the bolt 350 is screwed (and tightened) into the feed hole 210. Again, this is not an essential feature of the invention, and they can also be not aligned to each other along a straight line.

A. FIG. 6 shows a wheel cylinder 200B of a right-hand drum brake in one or more embodiments of the hydraulic component mounting assembly, that differs in that the wheel cylinder 200B is mounted on a right-hand drum brake backplate 100B and the position of the first mounting threaded hole configured to receive the stopping screw 450 is exchanged with the position of the second mounting threaded hole configured to receive the underplate screw 400. In particular, FIG. 5 shows the wheel cylinder 200B with the stopping screw 450 and underplate screw 400, which are not part of the wheel cylinder 200B already screwed (and tightened) into the first and second mounting threaded holes, respectively In one or more embodiments, the position of the first mounting threaded hole (configured to receive the stopping screw 450) is spaced apart from the feed hole 210 towards the rearward direction of the motor vehicle provided with the brake backplates 100A and 100B, while the position of the second mounting threaded hole (configured to receive the underplate screw 400) is spaced apart from the feed hole 210 towards the advance direction of the motor vehicle provided with the brake backplates 100A and 100B. However, it should be understood that this is not an essential feature for the invention, and that the same wheel cylinder, such as the one indicated with the reference numeral 200A in FIG. 4a, can be used for both the right-hand and left-hand drum brakes; in this case, the correct assembling of the various components can be guided by properly screwing the underplate screw 400 and the stopping screw 450 into the respective mounting threaded holes on the planar surface 230 of the wheel cylinder.

As already mentioned, the hydraulic component mounting assembly with anti-rotation banjo connection provides a poka-yoke operation, by preventing inadvertent errors causing misassembly. This is evident from FIGS. 7a and 7b showing an imaginary arrangement of a misassembly of the banjo plate 300 attached to the pipe 310, configured to be connected to a right-hand brake fluid supply hose through the fitting 315, with the wheel cylinder 200A of the left-hand drum brake shown in FIGS. 1-4: this arrangement is defined as "imaginary" because the stopping screw 450 would require to pass through the pipe 310, thus preventing such assembly. As shown in FIG. 6c, the only assembly allowed by the hydraulic component mounting assembly with anti-rotation banjo connection has such banjo plate 300 attached to the pipe 310, configured to be connected to a right-hand brake fluid supply hose through the fitting 315, that is fastened to the wheel cylinder 200B of the right-hand drum brake shown in FIG. 5 by screwing the bolt 350 into the feed hole 210 of the wheel cylinder 200B in turn fastened to the right-hand drum brake backplate 100B.

The various embodiments of this invention have been described and a number of variations have been suggested hereinbefore, but it should be understood that those skilled in the art can make other variations and changes without so departing from the scope of protection thereof, as defined by the attached claims.

The invention claimed is:

1. An anti-rotation banjo connection comprising
a banjo plate attached to a pipe at a first end edge of the banjo plate, the banjo plate including an opening configured to receive a bolt;
wherein the banjo plate further defines a hollow portion in fluid communication with the pipe via a transverse aperture defined by the banjo plate, wherein the hollow portion extends along a fluid flow axis of the banjo plate from the first end edge to the opening;
wherein the bolt is configured to be screwed into a port of a hydraulic component;
whereby the port is in fluid communication with the pipe by a fluid path offered by the bolt and the hollow portion when the bolt is screwed into the port;
wherein a second end edge of the banjo plate, opposite to the first end edge, is provided with a positioning notch configured to partially surround a stopping fastener when the bolt is screwed into the port and the stopping fastener is inserted into a first mounting hole of a surface of the hydraulic component so as to protrude from the surface by a first distance longer than a plate distance by which the banjo plate is spaced apart from the surface when the bolt is screwed into the port;

wherein an underplate fastener is at least partially located between the banjo plate and the surface of the hydraulic component when the banjo plate is attached to the hydraulic component;

whereby an edge wall delimiting the positioning notch is configured to interfere with the stopping fastener preventing the banjo plate from rotating about the bolt when the stopping fastener is inserted into the first mounting hole and the bolt is screwed into the port; and whereby the bolt is allowed to be screwed into the port when the stopping fastener is inserted into the first mounting hole only if the second end edge is closer than the first end edge to the stopping fastener; and wherein the surface includes a second mounting hole configured to receive an underplate fastener, wherein the underplate fastener protrudes from the surface by a second distance when the underplate fastener is inserted into the second mounting hole, wherein the second distance is shorter than the plate distance by which the banjo plate is spaced apart from the surface when the bolt is screwed into the port, whereby the banjo plate is configured to cover the underplate fastener when the underplate fastener is inserted into the second mounting hole and the bolt is screwed into the port.

2. The anti-rotation banjo connection according to claim 1, wherein the positioning notch is arranged on the second end edge along the fluid flow axis of the banjo plate.

3. The anti-rotation banjo connection according to claim 1, wherein the positioning notch is arranged on the second end edge in position that is offset from the fluid flow axis of the banjo plate.

4. The anti-rotation banjo connection according to claim 1, wherein the pipe is configured to be connected to a fluid hose through a fitting so as to be in fluid communication with a fluid line.

5. The anti-rotation banjo connection according claim 1, wherein the bolt is a solid piece having an external thread that is provided with at least one fluid flow notch forming a respective channel on the bolt external surface that is part of the fluid path offered by the bolt.

6. The anti-rotation banjo connection according to claim 1, wherein a banjo surface of the banjo plate which is closest to the surface of hydraulic component is spaced apart from the surface of the hydraulic component.

7. A hydraulic component mounting assembly comprising:
a hydraulic component having a port and including a surface, wherein the surface includes a first mounting hole configured to receive a stopping fastener, wherein the stopping fastener protrudes from the surface by a first distance when the stopping fastener is inserted into the first mounting hole; and
an anti-rotation banjo connection comprising
a banjo plate attached to a pipe at a first end edge of the banjo plate, the banjo plate including an opening configured to receive a bolt;
wherein the banjo plate further includes a hollow portion in fluid communication with the pipe and extending along a fluid flow axis of the banjo plate from the first end edge to the opening at which the banjo plate is provided with a transverse aperture configured to access the hollow portion;
wherein the bolt is configured to be screwed into the port of a hydraulic component;

whereby the port is in fluid communication with the pipe by a fluid path offered by the bolt and the hollow portion when the bolt is screwed into the port;

wherein a second end edge of the banjo plate, opposite to the first end edge, is provided with a positioning notch configured to partially surround a stopping fastener when the bolt is screwed into the port and the stopping fastener is inserted into the first mounting hole of a surface of the hydraulic component so as to protrude from the surface by a first distance longer than a plate distance by which the banjo plate is spaced apart from the surface when the bolt is screwed into the port;

whereby an edge wall delimiting the positioning notch is configured to interfere with the stopping fastener preventing the banjo plate from rotating about the bolt when the stopping fastener is inserted into the first mounting hole and the bolt is screwed into the port;

whereby the bolt is screwed into the port when the stopping fastener is inserted into the first mounting hole only if the second end edge is closer than the first end edge to the stopping fastener;

wherein an underplate fastener is at least partially located between the banjo plate and the surface of the hydraulic component when the banjo plate is attached to the hydraulic component; and wherein the surface includes a second mounting hole configured to receive an underplate fastener, wherein the underplate fastener protrudes from the surface by a second distance when the underplate fastener is inserted into the second mounting hole, wherein the second distance is shorter than the plate distance by which the banjo plate is spaced apart from the surface when the bolt is screwed into the port, whereby the banjo plate is configured to cover the underplate fastener when the underplate fastener is inserted into the second mounting hole and the bolt is screwed into the port.

8. The hydraulic component mounting assembly according to claim 7, wherein the first mounting hole is threaded and the stopping fastener is a stopping screw configured to be screwed into the first mounting hole.

9. The hydraulic component mounting assembly according to claim 7, wherein the surface includes a second mounting hole configured to receive an underplate fastener, wherein the underplate fastener protrudes from the surface by a second distance when the underplate fastener is inserted into the second mounting hole, wherein the second distance is shorter than a pipe distance by which the pipe is spaced apart from the surface when the bolt is screwed into the port, whereby the pipe is configured to cover the underplate fastener when the underplate fastener is inserted into the second mounting hole and the bolt is screwed into the port.

10. The hydraulic component mounting assembly according to claim 7, wherein the second mounting hole is threaded and the underplate fastener is an underplate screw configured to be screwed into the second mounting hole.

11. The hydraulic component mounting assembly according to claim 10, wherein the straight line is substantially parallel to the fluid flow axis of the banjo plate when the bolt is screwed into the port.

12. The hydraulic component mounting assembly according to claim 7, wherein the first mounting hole, the second mounting hole and the port are aligned to each other along a straight line.

13. The hydraulic component mounting assembly according to claim 7, wherein the port is arranged on a collar protruding from the surface by a third distance, whereby the first distance is longer than the third distance.

14. The hydraulic component mounting assembly according to claim 7, wherein the surface is a planar surface.

15. The hydraulic component mounting assembly according to claim 7, wherein the hydraulic component is a wheel cylinder of a drum brake.

16. The hydraulic component mounting assembly according claim 7, further comprising a drum brake backplate, having a front surface configured to be facing a brake drum when the drum brake backplate is mounted on a motor vehicle, wherein the surface is configured to get at least partially in contact with the front surface of the drum brake backplate when the wheel cylinder is mounted on the latter, wherein the stopping fastener is configured to clamp in combination with the surface a respective edge of at least one drum brake backplate aperture.

17. The hydraulic component mounting assembly according to claim 16, wherein an underplate fastener is configured to clamp in combination with the surface a respective edge of the at least one drum brake backplate aperture of a drum brake backplate aperture.

18. A process for assembling a hydraulic component mounting assembly comprising:

causing a surface of the hydraulic component mounting assembly to get at least partially in contact with a front surface of the drum brake backplate;

inserting a stopping fastener into a first mounting hole, whereby the stopping fastener clamps, in combination with the surface, a respective edge of an at least one drum brake backplate aperture;

causing a positioning notch to partially surround a stopping screw;

inserting a bolt into an opening of the banjo plate and screwing the bolt into a port;

wherein inserting the stopping fastener into the first mounting hole, the stopping fastener clamps, in combination with the surface, the respective edge of the at least one drum brake backplate aperture: and inserting an underplate fastener into a second mounting hole, whereby the underplate fastener clamps, in combination with the surface, the respective edge of the at least one drum brake backplate aperture.

19. The process according to claim 18, wherein the underplate fastener is at least partially located between the banjo plate and the surface of the hydraulic component when the banjo plate is attached to the hydraulic component.

* * * * *